Sept. 27, 1949.    F. C. MILLER    2,483,292
LAWN TRIMMER
Filed Aug. 30, 1947    2 Sheets-Sheet 1

INVENTOR.
Floyd C. Miller
BY
Hazard & Miller
Attorneys

Sept. 27, 1949.  F. C. MILLER  2,483,292
LAWN TRIMMER

Filed Aug. 30, 1947  2 Sheets-Sheet 2

INVENTOR.
Floyd C. Miller
BY
Hazard & Miller
Attorneys

Patented Sept. 27, 1949

2,483,292

UNITED STATES PATENT OFFICE 2,483,292

LAWN TRIMMER

Floyd C. Miller, Los Angeles, Calif.

Application August 30, 1947, Serial No. 771,515

2 Claims. (Cl. 56—251)

This invention relates to an improved lawn mower and trimmer and has for its object to provide a device which overcomes difficulties in prior devices.

A combined lawn mower and lawn trimmer permits an operator to cut the grass growing along a sidewalk, driveway, garden or the like and also to trim the edges of the grass bounding the margins of the sidewalk, driveway, garden or the like. Prior devices have been developed to accomplish these aims but have not come into wide use, a major reason being that the trimmer part of the device has heretofore been so constructed that although effective when first used, it becomes ineffective due to improper alignment of the trimmer cutter with respect to its fixed blade. A trimmer cutter and blade are subject to rough wear since the edges of sidewalks and driveways and the like are often uneven and the ruts bounding these edges frequently conceal rocks, nails and the like so that any trimmer cutter and blade are subject to proportionately rougher treatment than a lawn mower cutter and its fixed blade. It has been general practice heretofore to mount the trimmer cutter and fixed blade cantilever fashion, and thus after the trimmer cutter and fixed blade have undergone a period of incessant battering by uneven edges and foreign objects, they naturally become misaligned and the trimmer no longer functions properly. It is the main object of this invention to provide a rigid frame into which the trimmer cutter and fixed blade are mounted so that they are supported not in cantilever fashion but inside of the rigid frame so that they will be held in alignment under the most stringent operating conditions.

The trimmer cutter and fixed blade when properly spaced are so positioned with respect to one another that they contact one another lightly or are closely associated with each other, which spacing will be increased so that the blades are not properly spaced when the blades have worn down through long usage and it is another feature of this invention to provide means for maintaining this closely associated relationship.

Another feature of this invention is to provide a depth guide for the trimmer so that the trimmer may be moved along a rut without striking the bottom thereon.

The accompanying drawing illustrates the preferred embodiment of my invention but the limits of my invention will be set forth in the appended claims.

Figure 1:
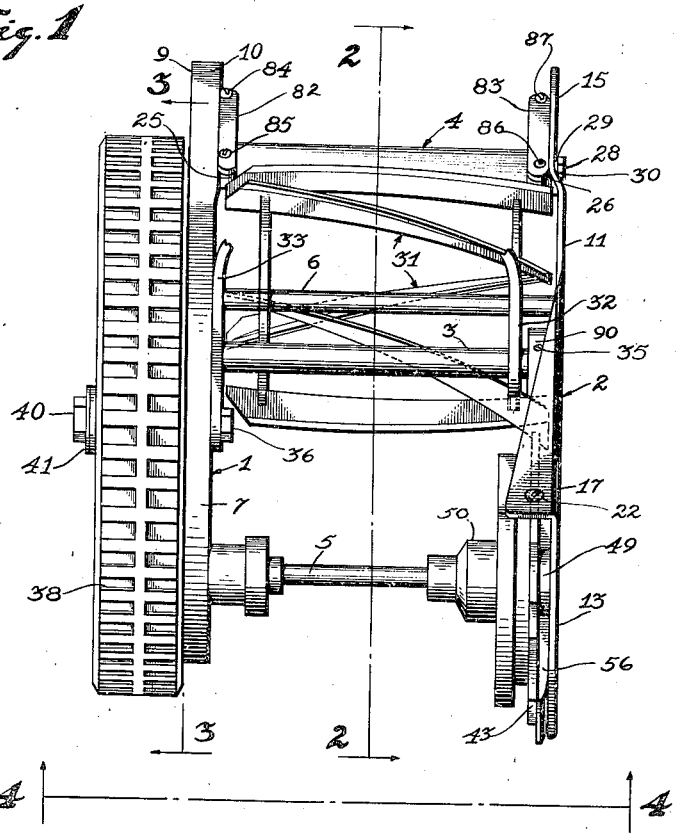
Fig. 1 is a plan view of the lawn mower and trimmer.

The combined lawn mower and lawn trimmer of the present invention has a frame composed of two sides plates 1 and 2 which are rigidly positioned in spaced parallel relationship, mainly by a spacing rod 3 and a spacing bar 4, and to a lesser extent by a lawn trimmer cutter shaft 5 and a lawn mower cutter shaft 6 both of which are rotatably mounted between said plates.

Plate member 1 has a disc portion 7 from which extends at right angles an outwardly facing peripheral flange 8. An approximately trapezoidal shaped portion 9 having inwardly facing marginal flanges on the two side edges thereof, one of said flanges 10 being shown in Fig. 1, and a curved base is so welded by its base to the front part of the outer surface of peripheral flange 8 that the outer face of the trapezoidal portion is flush with the outer edge of the peripheral flange and the inner edges of the marginal flanges on the trapezoidal portion are flush with the inner face of disc portion 7, with the bottommost edges of the edges of the marginal flanges being welded to the outside surface of the peripheral flange 8.

Figure 2:
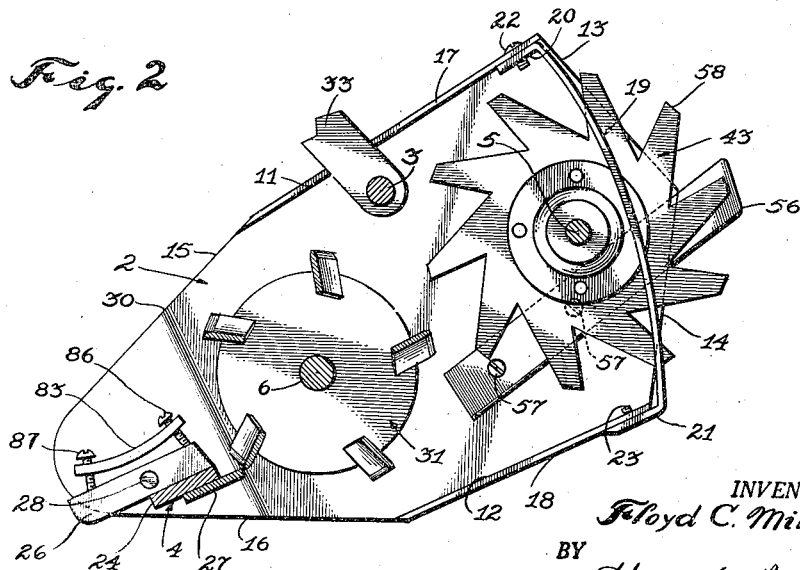
Fig. 2 is a sectional view of the lawn mower and trimmer taken through line 2—2 of Fig. 1 in the direction of the arrows.

The other plate member, plate member 2 has an elongated shape as clearly shown in Fig. 2 with an approximately straight top margin 11, substantially parallel straight bottom margin 12, these margins being joined by upper margins 13 and 14 forming an obtuse angle with one another and lower margins 15 and 16 forming an acute angle with one another, the apex of the acute angle being rounded. Hereinafter, the portion of the plate member 2 bounded by margins 15 and 16 will be referred to as the acute portion of said plate member and the portion of the plate member 2 bounded by margins 11 and 12 will be referred to as the middle portion of said plate member.

Plate member 2 has a pair of inwardly facing triangularly shaped marginal flanges 17 and 18, flange 17 extending from margin 11 and flange 18 extending from margin 12. A channeled shaped guide member 19, having legs 20 and 21 each having an outwardly extending wing, is fastened to inwardly facing marginal flanges 17 and 18, the wing of leg 20 being fastened to the inner surface of flange 17 by means of screw 22 and the wing of leg 21 being fastened to the outer surface of flange 18 by means of screw 23 as clearly shown in Figs. 4 and 2. This guide member serves as a depth guide so that the trimmer cutter will not contact the bottom of a rut bounding sidewalks, driveways, gardens and the like.

Spacing bar 4, which is one of the main spacing members between plates 1 and 2, comprises a rectangular plate 24 having end pieces 25 and 26 welded thereto, piece 25 being welded to the upper surface of plate 24 at one end thereof and piece 26 being welded to the upper surface of plate 24 at the other end thereof, both of said pieces being of such length as to overhang the trailing edge of plate 24, as can be seen in the case of piece 26 in Fig. 2. A fixed blade 27 for the lawn mower cutter is riveted to the front lower surface of plate 24. Spacing bar 4 is rigidly fastened by means of pieces 25 and 26 to plates 1 and 2 respectively, piece 26 being fastened to the inside lower end of the acute portion of plate 2 by means of a bolt 28, which has a lockwasher 29 fitted thereon and passed from the outside of said plate through an opening therein to thread in a threaded hole provided in piece 26 as shown in Fig. 2, and piece 25 being fastened in the same manner as piece 26 to the inside lower surface of the trapezoidal portion of plate 1 by a bolt and lockwasher not shown. The end part of the acute portion of plate member 2 is bent inward at 30 from the main part of the acute portion so that the outside of the head of bolt 28 will be flush with the outside face of plate member 2 as shown in Fig. 1.

Although spacing bar 4 is rigidly fastened to plates 1 and 2, it is adapted when acted on by a considerable force to be rotated around an axis passing through the centers of the bolts which fasten said bar to the plates, in order that the fixed blade 27 may be properly adjusted with respect to the cutter 31 of the lawn mower, which is rotatably mounted on shaft 6. Means for holding this bar and fixed blade in a definite position and for adjusting the blade are provided and consist of curved strips 82 and 83, see Figs. 1 and 2, which are welded to the inner face of plates 1 and 2 respectively, strip 82 having screws 84 and 85 threaded through the ends thereof and contacting opposite ends of piece 25, and strip 83 having screws 86 and 87 threaded through the ends thereof and contacting opposite ends of piece 26. It will be seen that by proper rotation of the screws, the proper angle of adjustment between fixed blade 27 and cutter 31 of the lawn mower can be obtained.

Spacing rod 3 which is the other of the main spacing members has the bifurcated ends 32 and 33 of a handle 34 mounted on reduced ends thereof and these ends of said rod are rigidly fastened to plates 1 and 2. One reduced end of rod 3 is passed through an opening provided in end 33 of handle 34 and has a drive fit into a bushing 90 which is welded to the inner surface of plate 2 and this means of fastening is reinforced by a set screw 35 which is threaded through bushing 90 and contacts said one reduced end of spacing rod 3. End 33 of handle 34 is longer than end 32 and has two openings, one spaced from the end thereof and in line with the opening in end 32 and the other near the end thereof, the in line opening enabling end 33 of the handle to be passed on to the other reduced end of rod 3 and up against the shoulder which is formed between the reduced portion of rod 3 and the unreduced portion of said rod. This other reduced end of rod 3 which is threaded near the end thereof and has end 33 of handle 34 mounted thereon is passed through an opening provided in the upper inner surface of the disc portion 7 of plate 1, and rod 3 is secured to the plate 1 by means of a nut and lockwasher not shown which threads on the threaded portion of the reduced end of rod 3 and abuts against the outer surface of the disc portion of plate 1 drawing the end of handle 34 tightly against the inside surface of said disc portion.

End 33 of handle 34 is fastened to the inner surface of the disc portion of plate 1 by means of bolt 36 also. Bolt 36 has only the end portion thereof threaded and has a drive fit with the opening in the extremity of end 33 of handle 34 and also a drive fit into an opening provided in the center of the disc portion of plate 1, and extends out from the outside face of said disc portion a sufficient distance to enable a long sleeve bushing 37 to be mounted thereon. A ground wheel 38 of conventional type having an internal gear 39 formed on the inner peripheral surface thereon is rotatably mounted on bushing 37 and prevented from slipping off said bushing and bolt 36 by a nut 40 and washer 41, the nut being threaded on the threaded end of bolt 36 and abutting against the end of the bushing which extends out a slight distance further than the hub of ground wheel 38 to allow said ground wheel to freely rotate. If desired, the ground wheel can be equipped with rubber tread on its periphery.

Figure 3:
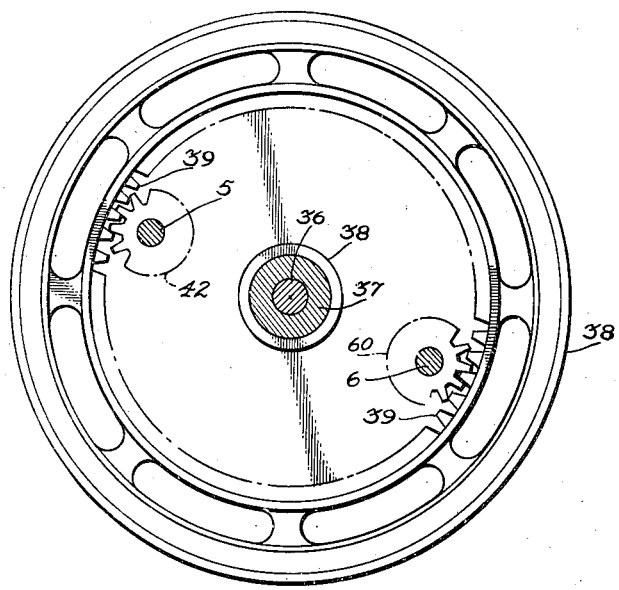
Fig. 3 is a sectional view of the lawn mower and trimmer taken along line 3—3 of Fig. 1 in the direction of the arrows.

The internal gear 39 formed on the inner peripheral surface of ground wheel 38 meshes with a spur gear 42 shown in Fig. 3, said spur gear being rotatably mounted on one end of trimmer cutter shaft 5, on the other end of which is fixedly mounted a rotating trimmer cutter shaft 5, on the other end of which is fixedly mounted a rotating trimmer cutter 43. Spur gear 42 has a driving connection to shaft 5 by a pawl and cam arrangement generally entitled 44, housed within said gear, which type of driving connection is common in the art and is illustrated and described in the patent to Engle No. 1,912,893, said connection constituting a driving connection with shaft 5 in only one direction of rotation of said ground wheel 38 as is peculiar to this type of connection. Shaft 5 is mounted at one end in ball bearing 45, the outer race of which is housed near the end of cylindrical housing 46, said housing passing through an opening in the disc portion of plate 1 and being welded thereto.

It is to be noted that spur gear 42 does not contact the end of cylindrical housing 46 and the fit between shaft 5 and the inner face of ball bearing 45 is such that the shaft is floating and may be moved longitudinally of the housing and bearing.

A cup-shaped dust cover 47 is mounted on shaft 5 and overlaps the inside end of cylindrical housing 46 and protects ball bearing 45 from dust and grit.

Figure 4:
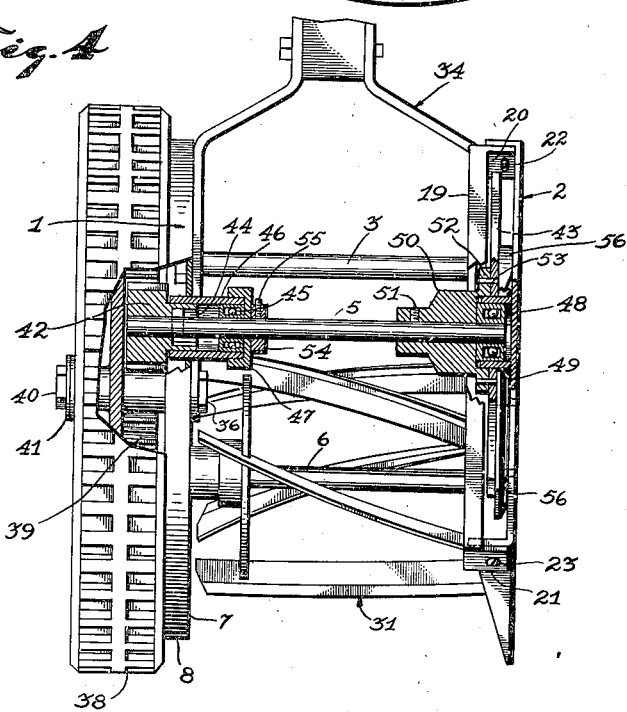
Fig. 4 is a front view of the lawn mower and trimmer with a part of the device cut away to show the method of mounting the trimmer cutter.

The other end of shaft 5 is mounted in ball bearing 48, the outer race of which is housed in ring bearing 49 which is welded to the inner surface of the middle portion of plate 2. The driving connection to rotating trimmer cutter 43 consists of a heavy collar 50 which has a close fit around shaft 5 and is fastened to said shaft by means of two set screws, one 51 of which is shown in Fig. 4. The heavy collar 50 has a reduced portion through which the set screws pass and an enlarged portion having a flange 52, the outside end of said collar being machined hollow so as to permit the collar to ride on the outside of ring bearing 49. Rotating trimmer cutter 43 is fastened to the outer face of flange 52 of the collar 50 by screws 53, of which two can be seen in Fig. 4. It is to be noted here, that there is a space between the end of ring bearing 49 and the inside of the machined hollow in collar 50 and the fit of shaft 5 within the inner race of ball bearing 48 is such as to permit said shaft to be moved longitudinally of said parts.

A collar 54 is mounted on shaft 5 adjacent dust cover 47 and provided with a set screw 55 and this collar serves to adjust shaft 5 longitudinally so that blades 58 of rotating trimmer cutter 43 will always be closely associated with a fixed trimmer cutter 56 which is mounted on the inside surface of plate 2 by means of two screws, each labeled 57, see Fig. 2.

A second spur gear 60 meshes with the internal gear 39, see Fig. 3, and is rotatably mounted on lawn mower cutter shaft 6 and there is a driving connection of the pawl and cam arrangement as described in connection with shaft 5 connecting spur gear 60 to shaft 6 which constitutes a driving connection in only one direction of rotation of ground wheel 38 as is peculiar to this type of connection. In this case, the pawl and cam arrangement is reversed with respect to the first pawl and cam arrangement, so that if the ground wheel 38 is rotated in one direction, the rotating trimmer cutter 43 only will be rotated and if said wheel is rotated in the other direction, the rotating lawn mower cutter 31 only will be rotated, this construction lessening the load on the operator, enabling him to move the combined lawn mower and trimmer device in one direction to perform one operation and in the other direction to perform the other operation with comparative ease.

Shaft 6 is rotatably mounted at one of its ends in plate 1 in a ball bearing, housing and dust cap construction identical to the construction described in connecting with the mounting of one end of shaft 5 in plate 1 and the housing is shown in Fig. 4 and entitled 61, the dust cap also shown in Fig. 4 and entitled 62. Shaft 6 is rotatably mounted at its other end in plate 2 by means of a ball bearing, not shown, which bearing is housed in a cylindrical housing 63, see Fig. 1, and provided with a dust cap 64.

The operation of the combined lawn mower and trimmer device is as follows.

When it is desired to mow the grass around the edges of sidewalks, driveways, gardens or the like, handle 34 is grasped, the machine turned until it is as depicted in Fig. 2, and the machine moved to the right of the drawing as the machine is shown in Fig. 2, this movement causing ground wheel 38 to roll along the grass, which motion is transmitted through the pawl and cam arrangement to the lawn mower cutter which cuts grass in the usual way. One side of the frame is supported by ground wheel 38 and the other side by margin 16 of plate 2 which slides along the ground.

When it is desired to trim the edges around sidewalks, driveways, gardens and the like, handle 34 is grasped and with reference to Fig. 2 the machine turned until margin 14 is on the ground and in this position, the machine is moved to the left of the drawing, with the depth guide strip 19 sliding along the top surface of a sidewalk or driveway preventing the trimmer cutter from riding on the bottom of the rut bounding sidewalks, driveways, gardens and the like.

It will be seen that this sturdy frame construction, will maintain the trimmer in proper alignment no matter how rough its usage. When the rotating trimmer blade and fixed trimmer blade wear to such an extent that they no longer trim correctly, it is necessary only to loosen set screw 55 in collar 54 and move the floating trimmer shaft 5 toward the fixed blade 56 so that the rotating trimmer blade and fixed trimmer blade are in proper cutting relationship once more.

Various changes may be made in the details of construction without departing from the spirit and scope of the invention as defined by the appended claims.

I claim:

1. A lawn edger having a rigid frame comprising two plate members rigidly positioned in upright spaced relation by spacing means, a ground wheel rotatably supported by one of the plate members on the outer side thereof, the other plate member having a substantially straight ground-engaging edge adapted to slide along the ground so that said outer plate and said ground wheel support the frame from the ground, a stationary edging blade rigidly mounted on said other plate member and positioned against the inner surface thereof and extending below the ground-engaging edge thereof, a sleeve member rigidly mounted on said other plate member and extending inwardly toward said one plate member, a driving shaft operatively connected to the ground wheel and floatingly rotatively supported by its ends in said one plate member and within the sleeve on said other plate member to permit axial movement thereof, a flat, circular, toothed cutter having a hub fixedly mounted on said driving shaft and recessed to fit over the sleeve to rotatably support the cutter on the sleeve, means for moving the driving shaft towards said other plate member to position the cutter against the stationary blade thereby positioning the cutter closely adjacent said other plate member to be shielded thereby, the cutter extending below the ground-engaging edge of said other plate member to enable the cutter and the stationary blade to cooperate to edge a lawn, said other plate member extending forward beyond the path of rotation of the cutter to protect the cutter from contact with objects into which the edger is pushed, and a handle rigidly connected to both plate members for pushing the lawn edger.

2. A lawn edger having a rigid frame comprising two plate members rigidly positioned in upright spaced relation by spacing means, a ground wheel rotatably supported by one of the plate members on the outer side thereof, the other plate member having a substantially straight ground-engaging edge adapted to slide along the ground so that said outer plate and said ground wheel support the frame from the ground, a stationary edging blade rigidly mounted on said other plate member and positioned against the inner surface thereof and extending below the ground-engaging edge thereof, a driving shaft operatively connected to the ground wheel and floatingly rotatively supported at its ends by the plate members so as to permit axial movement thereof, a flat circular toothed cutter fixedly mounted on the driving shaft and extending below the ground-engaging edge of said other plate member to enable the cutter and the stationary blade to cooperate to edge a lawn, means for moving the driving shaft towards said other plate member to position the cutter against the stationary blade thereby positioning the cutter closely adjacent the inner surface of said other plate member to be shielded thereby, said other plate member extending forward beyond the path of rotation of the cutter to protect the cutter from contact with objects into which the edger is pushed, and a handle rigidly connected to both plate members for pushing the lawn edger.

FLOYD C. MILLER.

REFERENCES CITED

The following references are of record in the file of this patent:

UNITED STATES PATENTS

| Number | Name | Date |
| --- | --- | --- |
| 223,505 | Hanley | Jan. 13, 1880 |
| 891,867 | Secrest | June 30, 1908 |
| 956,601 | Potter | May 3, 1910 |
| 1,489,868 | Wahl | Apr. 8, 1924 |
| 1,844,190 | Stultz | Feb. 9, 1932 |
| 2,158,580 | Houser | May 16, 1939 |

FOREIGN PATENTS

| Number | Country | Date |
| --- | --- | --- |
| 15,379 | Great Britain | July 1, 1909 |
| 206,962 | Great Britain | Nov. 22, 1923 |